United States Patent
Sakamoto et al.

(10) Patent No.: US 6,515,073 B2
(45) Date of Patent: Feb. 4, 2003

(54) ANTI-REFLECTIVE COATING-FORMING COMPOSITION

(75) Inventors: Yoshinori Sakamoto, Kanagawa (JP); Katsumi Omori, Kanagawa (JP); Yoshio Hagiwara, Tokyo (JP)

(73) Assignee: Tokyo Ohka Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 09/817,077

(22) Filed: Mar. 26, 2001

(65) Prior Publication Data

US 2001/0036998 A1 Nov. 1, 2001

(30) Foreign Application Priority Data

Mar. 30, 2000 (JP) ........................................ 2000-094170
Jan. 31, 2001 (JP) ........................................ 2001-022674

(51) Int. Cl.$^7$ .............................................. C08G 77/18
(52) U.S. Cl. ..................... 525/100; 525/474; 525/477; 106/287.14; 106/287.16
(58) Field of Search ................................ 525/474, 476, 525/100; 106/287.14, 287.16

(56) References Cited

U.S. PATENT DOCUMENTS

| | | | |
|---|---|---|---|
| 5,597,408 A | | 1/1997 | Choi |
| 5,736,301 A | * | 4/1998 | Fahey et al. ................. 430/325 |
| 5,744,243 A | * | 4/1998 | Li et al. ...................... 428/447 |
| 6,080,530 A | * | 6/2000 | Shao et al. ................... 430/325 |
| 6,156,479 A | * | 12/2000 | Meador et al. .............. 430/270.1 |
| 6,251,562 B1 | * | 6/2001 | Breyta et al. ............... 430/287.1 |

FOREIGN PATENT DOCUMENTS

| | | |
|---|---|---|
| JP | 06-138664 | 5/1994 |
| JP | 08-259782 | 10/1996 |
| JP | 09-003392 | 1/1997 |
| JP | 09-031399 | 2/1997 |
| JP | 09-059567 | 3/1997 |
| JP | 10-088068 | 4/1998 |
| JP | 10-150033 | 6/1998 |
| JP | 11-124543 | 5/1999 |
| JP | 11-258813 | 9/1999 |
| JP | 2000-044876 | 2/2000 |

OTHER PUBLICATIONS

English Counterparts and English Abstract From Derwent (Vendor Enhanced) for JP 8–87115.
English Counterparts and English Abstract From Derwent (Vendor Enhanced) for JP 9–292715.
English Counterparts and English Abstract From Derwent (Vendor Enhanced) for JP 10–228113.
English Counterparts and English Abstract From Derwent (Vendor Enhanced) for JP 10–204328.
English Counterparts and English Abstract From Derwent (Vendor Enhanced) for WO 97/07145.
English Counterparts and English Abstract From PLUSPAT for JP 12–44876.

* cited by examiner

Primary Examiner—Margaret G. Moore
(74) Attorney, Agent, or Firm—Fish & Richardson P.C.

(57) ABSTRACT

An anti-reflective coating-forming composition comprising: (A) at least one compound selected from the group consisting of (i) a compound represented by the following formula (1):

$$Si(OR^1)_a(OR^2)_b(OR^3)_c(OR^4)_d \qquad (1)$$

(ii) a compound represented by the following formula (2):

$$R^5Si(OR^6)_e(OR^7)_f(OR^8)_g \qquad (2)$$

and (iii) a compound represented by the following formula (3):

$$R^9R^{10}Si(OR^{11})_h(OR^{12})_i \qquad (3)$$

and (B) a thermosetting resin which can be condensed to said component (A) and has an absorption capacity with respect to exposing light.

5 Claims, No Drawings

ANTI-REFLECTIVE COATING-FORMING COMPOSITION

FIELD OF THE INVENTION

The present invention relates to an anti-reflective coating-forming composition. More particularly, the present invention relates to an anti-reflective coating-forming composition which is remarkably less subject to adverse effects of light reflected by the substrate when a pattern is formed by lithography and can be etched at a high rate even in the form of thick anti-reflective coating to form a high precision fine resist pattern.

BACKGROUND OF THE INVENTION

Processes for the production of semiconductors such as IC and LSI, liquid crystal display elements and circuit boards such as thermal head involve precision working with a photoresist. In recent years, higher precision has been required in this precision working. The trend in the art is for more manufacturers to use radiations having a shorter wavelength such as exima laser beam instead of far ultraviolet rays (having a wavelength of 300 nm or less). With the reduction of the wavelength of radiations, an approach involving the provision of an anti-reflective coating (bottom anti-reflective coating; BARC) between the photoresist and the substrate has been widely studied to eliminate adverse effects of standing wave developed by light reflected by the surface of the substrate. An organic anti-reflective coating comprising a light absorber and a polymer material has been proposed as an anti-reflective coating. Examples of the foregoing anti-reflective coating include a lithographic base material comprising a crosslinking agent component substituted by hydroxylalkyl group or alkoxyalkyl group, a benzophenone-based, diphenylsulfone-based or diphenylsulfoxide-based dye component and an acrylic resin component as disclosed in JP-A-8-87115 (The term "JP-A" as used herein means an "unexamined published Japanese patent application"), JP-A-9-292715 and JP-A-10-228113, and an anti-reflective composition comprising a resin binder containing quinolinyl group, quinolinyl group having N, O or S cyclic substituents, phenanthrenyl group, acridyl group or alkyleneanthracene group and a crosslinking material such as glycoluryl as disclosed in JP-A-10-204328.

As disclosed in WO97/07145, an anti-reflective coating composition mainly composed of two components such as anti-reflective coating composition comprising as main components a resin component obtained by polymerizing an epoxy resin with a dye component substituted by anthracene ring or naphthalene ring as a substituent and a crosslinking agent component such as melamine, urea, benzoguanamine and glycoluryl.

The organic anti-reflective coating-forming materials disclosed in the above cited patents have a high absorption capacity with respect to radiations, undergo no intermixing with a photoresist and exhibit a sufficient resistance to the developer for use in the development step after exposure. However, with the reduction of the wavelength of exposing light, the photoresist layer therefor has been required to have a reduced thickness. Further, anti-reflective coatings have been required to undergo etching at a raised rate. In this respect, all these anti-reflective coating-forming compositions are disadvantageous in that they cannot be etched at a sufficient rate. Accordingly, when the thickness of the photoresist pattern is increased to eliminate difference in level on the substrate, the reduction of thickness of photoresist pattern becomes remarkable, making it impossible to effect lithographic processing.

Further, JP-A-12-44876 proposes an anti-reflective coating material comprising an alkali-soluble resin and a disilane-based polysilane silica component entangled with each other on a molecular basis. However, the anti-reflective coating material thus proposed is disadvantageous in that it cannot be etched at a sufficient rate with respect to etching gases commonly used in the state-of-the-art process, making it difficult to form circuit patterns, etc.

SUMMARY OF THE INVENTION

Under these circumstances, the inventors made extensive studies. As a result, it was found that when a specific silane compound comprises a thermosetting resin incorporated therein which can be condensed to the silane compound and has a high absorption capacity with respect to exposing light, an anti-reflective coating-forming composition can be obtained which exhibits an enhanced absorption capacity with respect to reflected light or the like, allows the resulting anti-reflective coating to be etched at a raised rate, making it possible to cope with the reduction of thickness of photoresist layer and thus form an excellent pattern even when the thickness of anti-reflective coating is increased to eliminate difference in level on the substrate, and has a sufficient resistance to the developer.

It is therefore an object of the invention to provide an anti-reflective coating-forming composition which can form an anti-reflective coating having a high absorption capacity with respect to reflected light or the like, having no adverse effects of standing wave on thin resist film, allowing an etching rate high enough to cope with the reduction of thickness of photoresist layer even when the thickness of the anti-reflective coating is increased to eliminate difference in level on the substrate and having a sufficient resistance to the developer.

The foregoing object of the present invention will become apparent from the following detailed description and examples.

The foregoing object of the present invention is accomplished with an anti-reflective coating-forming composition comprising (A) at least one compound selected from the group consisting of (i) a compound represented by the following formula (1):

$$Si(OR^1)_a(OR^2)_b(OR^3)_c(OR^4)_d \quad (1)$$

wherein $R^1$, $R^2$, $R^3$ and $R^4$ each independently represent a $C_{1-4}$ alkyl group or phenyl group; a, b, c and d each independently represent an integer of from 0 to 4, with the proviso that the sum of a, b, c and d is 4; (ii) a compound represented by the following formula (2):

$$R^5Si(OR^6)_e(OR^7)_f(OR^8)_g \quad (2)$$

wherein $R^5$ represents a hydrogen atom, a $C_{1-4}$ alkyl group or phenyl group; $R^6$, $R^7$ and $R^8$ each independently represent a $C_{1-3}$ alkyl group or phenyl group; e, f and g each independently represent an integer of from 0 to 3, with the proviso that the sum of e, f and g is 3; and (iii) a compound represented by the following formula (3):

$$R^9R^{10}Si(OR^{11})_h(OR^{12})_i \quad (3)$$

wherein $R^9$ and $R^{10}$ each independently represent a hydrogen atom, a $C_{1-4}$ alkyl group or phenyl group; R11 and R12 each independently represent a $C_{1-3}$ alkyl group or phenyl group; h and i each independently represent an integer of from 0 to 2, with the proviso that the sum of h and i is 2 and (B) a thermosetting resin which can be condensed to the component (A) and has an absorption capacity with respect to exposing light.

DETAILED DESCRIPTION OF THE INVENTION

The present invention will be further described hereinafter.

As the component (A) to be incorporated in the antireflective coating-forming composition of the invention there is used at least one compound selected from the group consisting of the foregoing compounds (i), (ii) and (iii). Examples of the compound (i) include tetraalkoxysilanes such as tetramethoxysilane, tetraethoxysilane, tetrapropoxysilane, tetrabutoxysilane, tetraphenyloxysilane, trimethoxymonoethoxysilane, dimethoxydiethoxysilane, triethoxymonomethoxysilane, trimethoxymonopropoxysilane, monomethoxytributoxysilane, monomethoxytriphenyloxysilane, dimethoxydipropoxysilane, tripropoxymonomethoxysilane, trimethoxymonobutoxysilane, dimethoxydibutoxysilane, triethoxymonopropoxysilane, diethoxydipropoxysilane, tributoxymonopropoxysilane, dimethoxymonoethoxy monobutoxysilane, diethoxymonomethoxy monobutoxysilane, diethoxymonopropoxymonobutoxysilane, dipropoxymonomethoxy monoethoxysilane, dipropoxymonomethoxy monobutoxysilane, dipropoxymonoethoxymonobutoxysilane, dibutoxymonomethoxy monoethoxysilane, dibutoxymonoethoxy monopropoxysilane and monomethoxymonoethoxymonopropoxy monobutoxysilane, and oligomers thereof. Preferred among these compounds are tetramethoxysilane, tetraethoxysilane, and oligomers thereof.

Examples of the compound (ii) employable herein include trimethoxysilane, triethoxysilane, tripropoxysilane, triphenyloxysilane, dimethoxymonoethoxysilane, diethoxymonomethoxysilane, dipropoxymonomethoxysilane, dipropoxymonoethoxysilane, diphenyloxymonomethoxysilane, diphenyloxymonoethoxysilane, diphenyloxymonopropoxysilane, methoxyethoxypropoxysilane, monopropoxydimethoxysilane, monopropoxydiethoxysilane, monobutoxydimethoxysilane, monophenyloxydiethoxysilane, methyl trimethoxysilane, methyl triethoxysilane, methyl tripropoxysilane, ethyl trimethoxysilane, ethyl tripropoxysilane, ethyl triphenyloxysilane, propyl trimethoxysilane, propyl triethoxysilane, propyl triphenyloxysilane, butyl trimethoxysilane, butyl triethoxysilane, butyl tripropoxysilane, butyl triphenyloxysilane, methyl monomethoxydiethoxysilane, ethyl monomethoxydiethoxysilane, propyl monomethoxydiethoxysilane, butyl monomethoxydiethoxysilane, methyl monomethoxydipropoxysilane, methyl monomethoxydiphenyloxysilane, ethyl monomethoxydipropoxysilane, ethyl monomethoxy diphenyloxysilane, propyl monomethoxydipropoxysilane, propyl monomethoxydiphenyloxysilane, butyl monomethoxy dipropoxysilane, butyl monomethoxydiphenyloxysilane, methyl methoxyethoxypropoxysilane, propyl methoxyethoxy propoxysilane, butyl methoxyethoxypropoxysilane, methyl monomethoxymonoethoxybutoxysilane, ethyl monomethoxymonoethoxy monobutoxysilane, propyl monomethoxymonoethoxy monobutoxysilane, and butyl monomethoxymonoethoxy monobutoxysilane. Preferred among these compounds are trimethoxysilane, and triethoxysilane.

Examples of the compound (iii) employable herein include dimethoxysilane, diethoxysilane, dipropoxysilane, diphenyloxysilane, methoxyethoxysilane, methoxypropoxysilane, methoxyphenyloxysilane, ethoxypropoxysilane, ethoxyphenyloxysilane, methyl dimethoxysilane, methyl methoxyethoxysilane, methyl diethoxysilane, methyl methoxypropoxysilane, methyl methoxyphenyloxysilane, ethyl dipropoxysilane, ethyl methoxypropoxysilane, ethyl diphenyloxysilane, propyl dimethoxysilane, propyl methoxyethoxysilane, propyl ethoxypropoxysilane, propyl diethoxysilane, propyl diphenyloxysilane, butyl dimethoxysilane, butyl methoxyethoxysilane, butyl diethoxysilane, butyl ethoxypropoxysilane, butyl dipropoxysilane, butyl methylphenyloxysilane, dimethyl dimethoxysilane, dimethyl methoxyethoxysilane, dimethyl diethoxysilane, dimethyl diphenyloxysilane, dimethyl ethoxypropoxysilane, dimethyl dipropoxysilane, diethyl dimethoxysilane, diethyl methoxypropoxysilane, diethyl diethoxysilane, diethyl ethoxypropoxysilane, dipropyl dimethoxysilane, dipropyl diethoxysilane, dipropyl diphenyloxysilane, dibutyl dimethoxysilane, dibutyl diethoxysilane, dibutyl dipropoxysilane, dibutyl methoxyphenyloxysilane, methyl ethyl dimethoxysilane, methyl ethyl diethoxysilane, methyl ethyl dipropoxysilane, methyl ethyl diphenyloxysilane, methyl propyl dimethoxysilane, methyl propyl diethoxysilane, methyl butyl dimethoxysilane, methyl butyl diethoxysilane, methyl butyl dipropoxysilane, methyl ethyl ethoxypropoxysilane, ethyl propyl dimethoxysilane, ethyl propyl methoxyethoxysilane, dipropyl dimethoxysilane, dipropyl methoxyethoxysilane, propyl butyl dimethoxysilane, propyl butyl diethoxysilane, dibutyl methoxyethoxysilane, dibutyl methoxypropoxysilane, and dibutyl ethoxypropoxysilane. Preferred among these compounds are dimethoxysilane, diethoxysilane, methyldimethoxysilane, and methyldiethoxysilane.

The foregoing compounds (i) to (iii) may be properly selected and used. Particularly preferred among these combinations is a combination of compounds (i) and (ii) from the standpoint of excellence in resistance to developer and storage stability. The mixing proportion of the compounds (i) and (ii) to be combined is from 1:9 to 9:1, preferably from 1:7 to 5:1 by mol. When the mixing proportion of these compounds falls outside the above defined range, the resulting film is subject to cracking. Further, the composition exhibits a deteriorated storage stability to disadvantage.

The component (B) of the invention is not specifically limited so far as it is a thermosetting resin having a substituent or structure capable of being condensed to the component (A) and having a high capability of absorbing exposing light to prevent adverse effects of standing wave developed by light reflected by the substrate or irregular reflection caused by difference in level on the surface of the substrate. Examples of the thermosetting resin employable herein include phenolic resin, epoxy resin, acrylic resin, and amino resin. Particularly preferred among these thermosetting resins is phenolic resin. At least one of these thermosetting resins may be selected and used. Examples of the substituent or structure having a high absorption capacity with respect to exposing light include sulfone-based compound, benzophenone-based compound, anthracene-based compound and naphthalene-based compound substituted by hydroxyl group and/or carboxyl group. Particularly preferred among these compounds are bisphenylsulfone-based compound and benzophenone-based compound having at least two hydroxyl groups, anthracene-based compound having at least one hydroxyl group and/or hydroxyalkyl group, anthracene-based compound having carboxyl group and/or hydroxyl group, and naphthalene-based compound substituted by at least one carboxyl group and/or hydroxyl group. Examples of the bisphenylsulfone-based compound employable herein include bis (hydroxyphenyl)sulfones, and bis (polyhydroxyphenyl) sulfones. Specific examples of these compounds include bis(4-hydroxyphenyl)sulfone, bis(3,5-dimethyl-4-hydroxyphenyl)sulfone, bis(2,3-dihydroxyphenyl) sulfone, bis(2,4-dihydroxyphenyl)sulfone, bis(2,4-dihydroxy-6-methylphenyl)sulfone, bis(5-chloro-2,4-dihydroxyphenyl) sulfone, bis(2,5-dihydroxyphenyl)sulfone, bis(3,4-dihydroxyphenyl)sulfone, bis(3,5-dihydroxyphenyl) sulfone, bis(2,3,4-trihydroxyphenyl)sulfone, bis(2,3,4-trihydroxy-6-methylphenyl)sulfone, bis(5-chloro-2,3,4-trihydroxyphenyl)sulfone, bis(2,4,6-trihydroxyphenyl) sulfone, and bis(5-chloro-2,3-dihydroxyphenyl)sulfone. Specific examples of the benzophenone-based compound employable herein include 2,4-dihydroxybenzophenone, 2,3,4-trihydroxybenzophenone, 2,2',4,4'-tetrahydroxybenzophenone, 2,2',5,6'-tetrahydroxybenzophenone, 2,2'-dihydroxy-4-methoxybenzophenone, 2,6-dihydroxy-4-methoxybenzophenone, 2,2'-dihydroxy-4,4'-dimethoxybenzophenone, 4-dimethylamino-2',4'-dihydroxybenzophenone, and 4-dimethylamino-3',4'-dihydroxybenzophenone. As the anthracene-based compound having at least one hydroxyl group or hydroxylalkyl group there may be used a compound represented by the following formula (4):

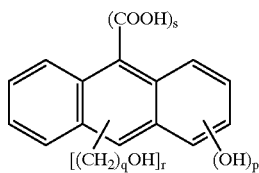

(4)

wherein p represents an integer of from 0 to 8; q represents an integer of from 1 to 10; r represents an integer of from 0 to 6; s represents an integer of from 0 to 2, with the proviso that p, q and r are not 0 at the same time. Specific examples of the foregoing compound include 1-hydroxyanthracene, 9-hydroxyanthracene, anthracene-9-carboxylic acid, anthracene-9,10-dicarboxylic acid, 1,2-dihydroxyanthracene, 1,2-dihydroxy-9-carboxyanthracene, 1,5-dihydroxyanthracene, 1,5-dihydroxy-9-carboxyanthracene, 9,10-dihydroxyanthracene, 1,2-dihydroxy-9-carboxyanthracene, 1,2,3-trihydroxy anthracene, 1,2,3,4-tetrahydroxyanthracene, 1,2,3,4,5,6-hexahydroxyanthracene, 1,2,3,4,5,6,7,8-octahydroxyanthracene, 1-hydroxymethylanthracene, 9-hydroxymethylanthracene, 9-hydroxyethylanthracene, 9-hydroxyhexylanthracene, 9-hydroxyoctylanthracene, and 9,10-dihydroxymethylanthracene.

Specific examples of the naphthalene-based compound employable herein include 1-naphthol, 2-naphthol, 1-naphthalinethanol, 2-naphthalinethanol, 1,3-naphthalinediol, naphthaline-1-carboxylic acid, naphthaline-2-carboxylic acid, naphthaline-1,4-dicarboxylic acid, naphthaline-2,3-dicarboxylic acid, naphthaline-2,6-dicarboxylic acid, naphthaline-2,7-dicarboxylic acid, and naphthaline-1-acetic acid.

The amount of the foregoing thermosetting resin to be incorporated is not specifically limited. In practice, however, it is preferably from 10 to 300% by weight, more preferably from 15 to 200% by weight based on the solid content of the component (A) as calculated in terms of $SiO_2$. When the amount of the foregoing thermosetting resin to be incorporated falls below the above defined range, the resulting composition cannot sufficiently absorb reflected light or irregular reflection, making it impossible to lessen the adverse effects of standing wave. On the contrary, when the amount of the foregoing thermosetting resin to be incorporated exceeds the above defined range, the resulting anti-reflective coating exhibits a raised hardness that reduces the etching rate and hence makes it impossible to provide a thick film to disadvantage.

Unlike the resin as component (B), the component (C) of the invention may be an organic acid or inorganic acid which has been heretofore commonly used for organic anti-reflective coating. As such an organic acid there may be used a carboxylic acid such as formic acid, oxalic acid, fumaric acid, maleic acid, glacial acetic acid, acetic anhydride, propionic acid and n-butyric acid or an organic acid having a sulfur-containing acid residue. As such an organic acid having a sulfur-containing acid residue there may be used an organic sulfonic acid. Examples of esterification products of such an organic acid include organic sulfuric acid ester, and organic sulfurous acid ester. Particularly preferred among these organic acids is organic sulfonic acid such as compound represented by the following formula (5):

$$R^{13}\text{-}X \qquad (5)$$

wherein $R^{13}$ represents a hydrocarbon group having or free of substituents; and X represents a sulfone acid group.

In the foregoing formula (5), the hydrocarbon group represented by $R^{13}$ preferably has from 1 to 20 carbon atoms. The hydrocarbon group may be saturated or unsaturated or may be straight-chain, branched or cyclic. The hydrocarbon group represented by $R^{13}$, if it is cyclic, is preferably an aromatic hydrocarbon group such as phenyl, naphthyl and anthryl, particularly phenyl. The aromatic ring in the aromatic hydrocarbon group may have one or plural $C_{1-20}$ hydrocarbon groups bonded thereto. The $C_{1-20}$ hydrocarbon group may be saturated or unsaturated or may be straight-chain, branched or cyclic. Examples of the foregoing substituents include halogen atom such as fluorine, sulfonic acid group, carboxyl group, hydroxyl group, amino group, and cyano group. One or more such substituents may substitute on the hydrocarbon group. As such an organic sulfonic acid there may be used nonafluorobutanesulfonic acid, methanesulfonic acid, trifluoromethanesulfonic acid, dodecylbenzenesulfonic acid or mixture thereof in particular from the standpoint of effect of improving the shape of the bottom of resist pattern. As the inorganic acid there may be used sulfuric acid, phosphoric acid, nitric acid, hydrochloric acid or the like. Particularly preferred among these inorganic acids are phosphoric acid and nitric acid.

The foregoing component (C) acts as a catalyst for the hydrolysis of a silane compound in the presence of water. The amount of water to be added is preferably from 1.5 to 4.0 mols per mol of the total amount of silane compound. The acidic compound may be added after the addition of water. Alternatively, the acidic compound may be mixed with water to give an aqueous solution of acid which is then added. The amount of the acidic compound to be used is preferably such that the concentration of acidic compound in the hydrolysis system is from 300 to 800 ppm, particularly from 400 to 600 ppm. The hydrolysis reaction is normally completed in from about 5 to 100 hours. In order to reduce the reaction time, it is preferred that heating be effected at a temperature of not higher than 80° C.

The foregoing various components are dissolved in an organic solvent as the component (D) to prepare a coating solution of anti-reflective coating-forming composition. Examples of the organic solvent to be used herein include monovalent alcohols such as methyl alcohol, ethyl alcohol, propyl alcohol and butyl alcohol, polyvalent alcohols such as ethylene glycol, diethylene glycol, propylene glycol, glycerin, trimethylol propane, and hexane triol, monoethers of polyvalent alcohol such as ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, propylene glycol monomethyl ether, propylene glycol monoethyl ether, propylene glycol monopropyl ether and propylene glycol monobutyl ether, monoacetates thereof, esters such as methyl acetate, ethyl acetate, butyl acetate and ethyl lactate, ketones such as acetone, methyl ethyl ketone and methyl isoamyl ketone, and polvalent alcohol ethers obtained by fully alkyletherifying polyvalent alcohol ethers such as ethylene glycol dimethyl ether, ethylene glycol diethyl ether, ethylene glycol dipropyl ether, ethylene glycol dibutyl ether, propylene glycol dimethyl ether, propylene glycol diethyl ether, diethylene glycol dimethyl ether, diethylene glycol diethyl ether and diethylene glycol methyl ethyl ether. In particular, polyvalent alcohol ethers obtained by fully or partially alkyletherifying polyvalent alcohol ethers or monoacetates thereof are preferred.

The foregoing organic solvents may be used singly or in combination of two or more thereof. The amount of the organic solvent to be used is preferably from 10 to 30 mol per mole of the total amount of silane compound. The coating solution thus prepared can be used as it is. Alternatively, the coating solution may be diluted with a diluting solvent because of adjust the solid concentration in the coating solution. As the diluting solvent there may be used any of the foregoing organic solvents. In the preparation of the coating solution, it is important that the amount of the alcohol solvent used or the alcohol produced by the hydrolysis reaction of the silane compound is 15% by weight or less based on the total amount of the coating solution. When the alcohol remains in an amount of more than 15% by weight, H—Si group reacts with the alcohol, making it easy to produce RO—Si group. The resulting coating solution undergoes gelation that causes deterioration of storage stability. Further, the coating solution undergoes cracking. In the case where an alcohol is excessively incorporated in the coating solution, it is removed by distillation under reduced pressure. The distillation under reduced pressure is preferably effected at a pressure of from $39.9 \times 10^2$ to $39.9 \times 10^3$ Pa, more preferably from $66.5 \times 10^2$ to $26.6 \times 10^3$ Pa, at a temperature of from 20° C. to 50° C. for 2 to 6 hours.

In order to inhibit the striation of the coat layer, the coating solution may comprise a fluorine-based or silicon-based surface active agent (F) incorporated therein. Examples of the component (F) employable herein include X-70-093 (produced by Shinetsu Chemical Co., Ltd.), Pionin (produced by Takemoto Oil & Fat Co., Ltd.), and FC-171 and FC-430 (produced by Sumitomo 3M Co., Ltd.).

The anti-reflective coating formed by selecting the mixing proportion of the components (A) and (B) in the foregoing anti-reflective coating-forming composition is sparse or dense. A sparse anti-reflective coating exhibits a lowered refractive index (n) and can be etched at a raised rate. On the contrary, a dense anti-reflective coating exhibits a high refractive index but is etched at a lowered rate. Further, the absorptivity coefficient (k) varies with the amount of the component (B) to be incorporated. Thus, the kind and amount of the components (A) and (B) to be incorporated in the anti-reflective coating-forming composition of the invention are preferably predetermined as the values n and k are determined depending on the radiation used. Referring to the value k, when as the component (C) there is used a sulfone-based compound or benzophenone-based compound if the radiation to be used is an ArF exima laser beam or an anthracene-based or naphthalene-based compound if the radiation to be uses is a KrF exima laser beam, a high k value can be obtained to improve the anti-reflection properties.

As a method of using the anti-reflective coating-forming composition of the invention there may be used a method which comprises applying a coating solution made of the anti-reflective coating-forming composition of the invention to a substrate such as silicon wafer, glass substrate and circuit board by a coating means such as spinner, forming a photoresist layer on the coat layer, selectively irradiating the resist layer with a radiation such as far ultraviolet ray and exima laser beam from an exposure apparatus, developing the resist layer to form a resist pattern, and then subjecting the substrate to etching so that it is selectively etched.

The present invention will be further described in the following examples, but the present invention should not be construed as being limited thereto.

EXAMPLE 1

136 g (1 mol) of trimethoxysilane, 152 g (1 mol) of methyl orthosilicate, 786 g of propyl glycol dimethyl ether, 126 g of water, and 100 μl of nitric acid were mixed to obtain a solution. The solution thus obtained was then stored at room temperature (20° C.). Ethyl lactate was then added to the solution so that the solid concentration thereof reached 5% by weight as calculated in terms of $SiO_2$.

Separately, to a phenolic novolak resin (trade name: TO-212, produced by Sumitomo Durez Co., Ltd.) was added the foregoing alkoxysilane solution in an amount of 50% by weight based on the weight thereof as calculated in terms of $SiO_2$ to prepare an anti-reflective coating-forming composition. The composition thus obtained was applied to a silicon wafer by means of a spinner, and then continuously baked on a multiple stage basis at a temperature of 80° C., 130° C., 200° C. and then 250° C. to form an anti-reflective coating having a thickness of 3,000 Å. The anti-reflective coating thus formed exhibited a refractive index (n) and an absorptivity coefficient (k) as set forth in Table 1.

Subsequently, DP-617HL (produced by TOKYO OHKA KOGYO LTD.), which is a chemically-sensitized positive-working photoresist, was applied to the foregoing anti-reflective coating, and then pre-baked at a temperature of 120° C. for 90 seconds to obtain a photoresist layer having a thickness of 4,500 Å. The photoresist layer thus obtained was exposed to light from a Type S-230B exposing apparatus (produced by NIKON CORPORATION), post-baked at a temperature of 110° C. for 90 seconds, and then paddle-developed with a Type NMD-3 developer (produced by TOKYO OHKA KOGYO LTD.) at a temperature of 23° C. for 60 seconds to form a line-and-space pattern having a line width of 0.16 μm which was then observed under SEM (scanning electron microscope). As a result, cross sectional profile of patterned resist layer was found that all of the line-and-space patterned resist layers had a orthogonal cross sectional profile standing upright on the silicon wafer surface without any irregularities.

Using OAPM (produced by TOKYO OHKA KOGYO LTD.), the anti-reflective coating was then subjected to dry etching with a fluorine-based etching gas ($CF_3/CHF_3/He$) at a pressure of $39.9 \times 10^3$ Pa, an output of 400 W and a temperature of 25° C. with the foregoing photoresist pattern as a mask. The etching rate during this procedure was determined as calculated in terms of reduction of the thickness of the anti-reflective coating per minute from before etching to after a predetermined period of time of etching determined by a thickness meter (trade name: Prometrix, produced by KLA Tencole Co., Ltd.). The results are set forth in Table 1.

EXAMPLE 2

The procedure of Example 1 was followed except that the amount of the phenolic novolak resin used was changed to 150% by weight as calculated in terms of $SiO_2$. Thus, an anti-reflective coating was formed on a silicon wafer. The anti-reflective coating thus formed exhibited a refractive index (n) and an absorptivity coefficient (k) as set forth in Table 1. The photoresist pattern thus formed was observed. As a result, cross sectional profile of patterned resist layer was found that all of the line-and-space patterned resist layers had a orthogonal cross sectional profile standing upright on the silicon wafer surface without any irregularities. The rate at which etching is conducted with this photoresist pattern as a mask was determined in the same manner as in Example 1. The results are set forth in Table 1.

EXAMPLE 3

The procedure of Example 1 was followed except that the amount of the phenolic novolak resin used was changed to 200% by weight as calculated in terms of $SiO_2$. Thus, an anti-reflective coating was formed on a silicon wafer. The anti-reflective coating thus formed exhibited a refractive index (n) and an absorptivity coefficient (k) as set forth in Table 1. The photoresist pattern thus formed was observed. As a result, cross sectional profile of patterned resist layer was found that all of the line-and-space patterned resist layers had a orthogonal cross sectional profile standing upright on the silicon wafer surface without any irregularities. The rate at which etching is conducted with this photoresist pattern as a mask was determined in the same manner as in Example 1. The results are set forth in Table 1.

EXAMPLE 4

The procedure of Example 1 was followed except that to the anti-reflective coating-forming composition of Example 2 was added a siloxane-based surface active agent (trade name: X-70-093, produced by Shinetsu Chemical Co., Ltd.) in an amount of 20 μl based on 50 g of the entire composition. Thus, an anti-reflective coating was formed on a silicon wafer. The anti-reflective coating thus formed exhibited a refractive index (n) and an absorptivity coefficient (k) as set forth in Table 1. The photoresist pattern thus formed was observed. As a result, cross sectional profile of patterned resist layer was found that all of the line-and-space patterned resist layers had a orthogonal cross sectional profile standing upright on the silicon wafer surface without any irregularities. The rate at which etching is conducted with this photoresist pattern as a mask was determined in the same manner as in Example 1. The results are set forth in Table 1.

EXAMPLE 5

A 0.16 μm line-and-space pattern was formed on an anti-reflective coating formed by the anti-reflective coating-forming composition of Example 1 in the same manner as in Example 1 except that TArF6a-37 (produced by TOKYO OHKA KOGYO CO., LTD.), which is a chemically-sensitized positive-working photoresist composition, was used. The line-and-space pattern thus formed was then observed under SEM. As a result, cross sectional profile of patterned resist layer was found that all of the line-and-space patterned resist layers had a orthogonal cross sectional profile standing upright on the silicon wafer surface without any irregularities.

EXAMPLE 6

A photoresist pattern was formed in the same manner as in Example 1 except that as the solvent there was used propylene glycol monomethyl ether acetate. The photoresist pattern thus formed were excellent in properties such as embeddability in the substrate and surface conditions. The resulting 0.16 μm line-and-space photoresist pattern was found that all of the line-and-space patterned resist layers had a orthogonal cross sectional profile standing upright on the silicon wafer surface without any irregularities.

COMPARATIVE EXAMPLE 1

40 g of bis(4-hydroxyphenyl)sulfone and 60 g of Cymel 1125-80 (produced by Mitsui Cyanamid Co., Ltd. ) were dissolved in 1,200 g of propylene glycol monomethyl ether to prepare a base material solution. The base material solution thus prepared was spinner-coated onto a silicon wafer, dried at a temperature of 90° C. for 90 seconds, and then heated to a temperature of 180° C. for 90 seconds to form an anti-reflective coating having a thickness of 3,000 Å. The anti-reflective coating thus formed exhibited a refractive index (n) and an absorptivity coefficient (k) as set forth in Table 1. In an attempt to obtain a photoresist pattern in the same manner as in Example 1, the anti-reflective coating was then processed. However, since the reduction of thickness of photoresist pattern was drastic, the pattern could not be evaluated. The rate at which etching is effected with this photoresist pattern as a mask was determined in the same manner as in Example 1. The results are set forth in Table 1.

EXAMPLE 7

60 g (as calculated in terms of $SiO_2$) of trimethoxysilane, 60 g (as calculated in terms of $SiO_2$) of methyl orthosilicate, 786 g of propylene glycol monomethyl ether acetate, 126 g of water, and 30 g of a 20% dodecylbenzenesulfonic acid solution were mixed to obtain a solution. The solution thus obtained was then stored at room temperature (20° C.). Ethyl lactate was then added to the solution so that the solid concentration thereof reached 5% by weight as calculated in terms of $SiO_2$.

Separately, to a phenolic novolak resin (trade name: TO-212, produced by Sumitomo Durez Co., Ltd.) was added the foregoing alkoxysilane solution in an amount of 50% by weight based on the weight thereof as calculated in terms of $SiO_2$ to prepare an anti-reflective coating-forming composition. The composition thus obtained was applied to a silicon wafer by means of a spinner, and then continuously baked on a multiple stage basis at a temperature of 80° C., 130° C., 200° C. and then 250° C. to form an anti-reflective coating having a thickness of 1,300 Å. The anti-reflective coating thus formed exhibited a refractive index (n) and an absorptivity coefficient (k) as set forth in Table 1.

Subsequently, 6a-66-D3 (produced by TOKYO OHKA KOGYO LTD.), which is a chemically-sensitized positive-working photoresist, was applied to the foregoing anti-reflective coating, and then pre-baked at a temperature of 120° C. for 90 seconds to obtain a photoresist layer having a thickness of 400 nm. The photoresist layer thus obtained was exposed to light from a Type S-230B exposing apparatus (produced by NIKON CORPORATION), post-baked at a temperature of 110° C. for 90 seconds, and then paddle-developed with a Type NMD-3 developer (produced by TOKYO OHKA KOGYO LTD.) at a temperature of 23° C. for 60 seconds to form a line-and-space pattern having a line width of 0.16 μm which was then observed under SEM (scanning electron microscope). As a result, cross sectional profile of patterned resist layer was found that all of the line-and-space patterned resist layers had a orthogonal cross sectional profile standing upright on the silicon wafer surface without any irregularities.

Using OAPM (produced by TOKYO OHKA KOGYO LTD.), the anti-reflective coating was then subjected to dry etching with a fluorine-based etching gas ($CF_3/CHF_3/He$) at a pressure of $39.9 \times 10^3$ Pa, an output of 400 W and a temperature of 25° C. with the foregoing photoresist pattern as a mask. The etching rate during this procedure was determined as calculated in terms of reduction of the thickness of the anti-reflective coating per minute from before etching to after a predetermined period of time of etching determined by a thickness meter (trade name: Prometrix, produced by KLA Tencole Co., Ltd.). The results are set forth in Table 1.

EXAMPLE 8

An anti-reflective coating was formed on a silicon wafer in the same manner as in Example 7 except that dodecyl-benzenesulfonic acid was replaced by nonafluorobutane-sulfonic acid. The photoresist pattern thus formed was observed. As a result, the photoresist pattern was found to be sufficiently rectangular. The rate at which etching is effected with this photoresist pattern as a mask was determined in the same manner as in Example 7. The results are set forth in Table 1.

TABLE 1

|  | n value | k value | Etching rate (nm/min) |
|---|---|---|---|
| Example 1 | 1.64 | 0.17 | 296.9 |
| Example 2 | 1.62 | 0.26 | 189.4 |
| Example 3 | 1.43 | 0.21 | 149.6 |
| Example 4 | 1.62 | 0.26 | 187.5 |
| Example 7 | 1.43 | 0.56 | 164.8 |
| Example 8 | 1.40 | 0.55 | 172.4 |
| Comparative Example 1 | 1.78 | 0.42 | 137.6 |

As can be seen in Table 1 above, the anti-reflective coating-forming composition of the invention exhibits a high absorption capacity with respect to reflected light as well as a high etching rate.

The anti-reflective coating-forming composition of the invention exhibits a high absorption capacity with respect to reflected light, making it possible to lessen adverse effects of standing wave. The anti-reflective coating-forming composition of the invention allows etching at a raised rate, making it possible to form a thick anti-reflective coating. Thus, a resist pattern having an excellent shape can be formed from a thin resist layer. Further, an anti-reflective coating having a sufficient resistance to developer can be formed. Accordingly, the anti-reflective coating-forming composition of the invention has an industrially high value.

While the invention has been described in detail and with reference to specific embodiments thereof, it will be apparent to one skilled in the art that various changes and modifications can be made therein without departing from the spirit and scope thereof.

What is claimed is:

1. An anti-reflective coating-forming composition comprising:

(a) at least one compound selected from the group consisting of (i) a compound represented by the following formula (1):

$$Si(OR^1)_a(OR^2)_b(OR^3)_c(OR^4)_d \qquad (1)$$

wherein $R^1$, $R^2$, $R^3$, and $R^4$ each independently represent a $C_{1-4}$ alkyl group or phenyl group; a, b, c and d each independently represent an integer of from 0 to 4, with the proviso that the sum of a, b, c and d is 4; (ii) a compound represented by the following formula (2):

$$R^5Si(OR^6)_e(OR^7)_f(OR^8)_g \qquad (2)$$

wherein $R^5$ represents a hydrogen atom, a $C_{1-4}$ alkyl group or phenyl group; $R^6$, $R^7$ and $R^8$ each independently represent a $C_{1-3}$ alkyl group or phenyl group; e, f and g each independently represent an integer of from 0 to 3, with the proviso that the sum of e, f and g is 3; and (iii) a compound represented by the following formula (3):

$$R^9R^{10}Si(OR^{11})_h(OR^{12})_i \qquad (3)$$

wherein $R^1$ and $R^{10}$ each independently represent a hydrogen atom, a $C_{1-4}$ alkyl group or phenyl group; $R^{11}$ and $R^{12}$ each independently represent a $C_{1-3}$ alkyl group or phenyl group; h and i each independently represent an integer of from 0 to 2, with the proviso that the sum of h and i is 2; and (b) a thermosetting resin which can be condensed to said component (A) and has an absorption capacity with respect to exposing light;

(c) an acidic compound, (d) an organic solvent; and (e) water.

2. The anti-reflective coating-forming composition according to claim 1, wherein said exposing light has a wavelength of 248 nm or less.

3. The anti-reflective coating-forming composition according to claim 1, wherein said compound (i) represented by said formula (1) is tetramethoxysilane, tetraethoxysilane, or oligomers thereof, said compound (ii) represented by said formula (2) is trimethoxysilane or triethoxysilane, and said compound (iii) represented by said formula (3) is dimethoxysilane, diethoxysilane, methyldimethoxysilane, or methyldiethoxysilane.

4. The anti-reflective coating-forming composition according to claim 1, wherein said (A) is a combination of said compound (i) and said compound (ii).

5. The anti-reflective coating-forming composition according to claim 4, where molar ratio of said compound (i) and said compound (ii) is from 1:7 to 5:1.

* * * * *